Nov. 28, 1967  F. V. HALL  3,354,887
APPARATUS FOR COMPACTING CIGARETTE FILTER TIP ASSEMBLIES
CONTAINING GRANULAR MATERIAL
Filed Jan. 4, 1965  7 Sheets-Sheet 1

INVENTOR.
FLOYD V. HALL
BY Kenyon & Kenyon
ATTORNEYS

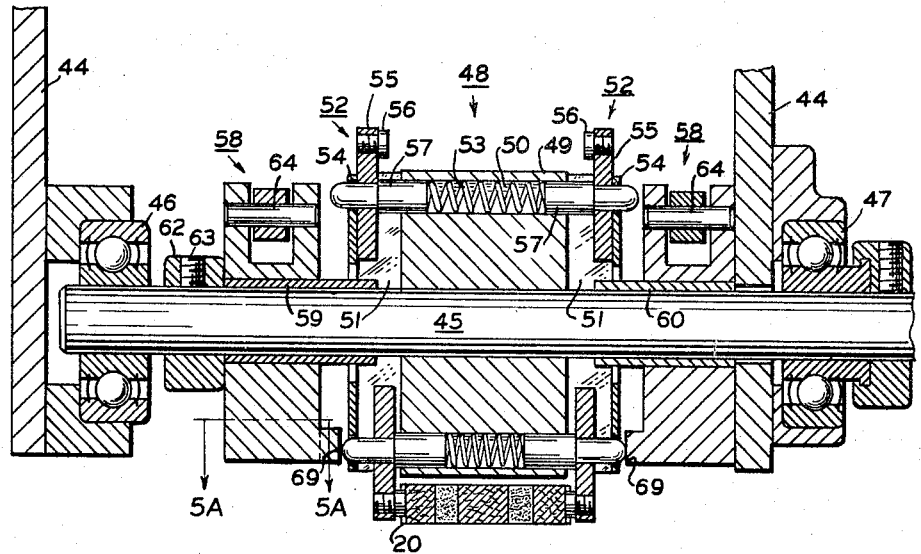
Fig.5
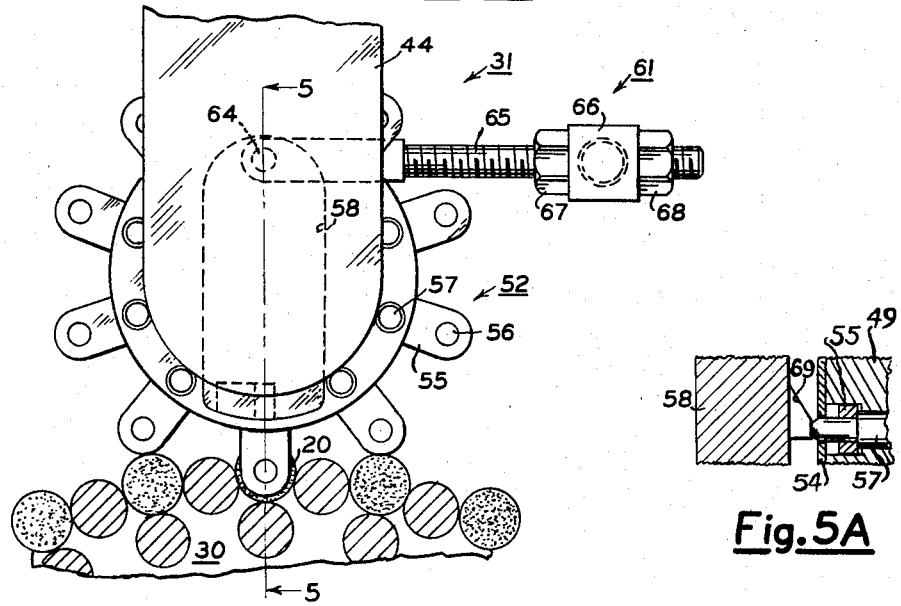
Fig.6
Fig.5A
INVENTOR.
FLOYD V. HALL
BY
ATTORNEYS

INVENTOR.
FLOYD V. HALL
BY
ATTORNEYS

Nov. 28, 1967  F. V. HALL  3,354,887
APPARATUS FOR COMPACTING CIGARETTE FILTER TIP ASSEMBLIES
CONTAINING GRANULAR MATERIAL
Filed Jan. 4, 1965  7 Sheets-Sheet 5

INVENTOR.
FLOYD V. HALL
BY Kenyon & Kenyon
ATTORNEYS

Nov. 28, 1967   F. V. HALL   3,354,887
APPARATUS FOR COMPACTING CIGARETTE FILTER TIP ASSEMBLIES
CONTAINING GRANULAR MATERIAL
Filed Jan. 4, 1965   7 Sheets-Sheet 6
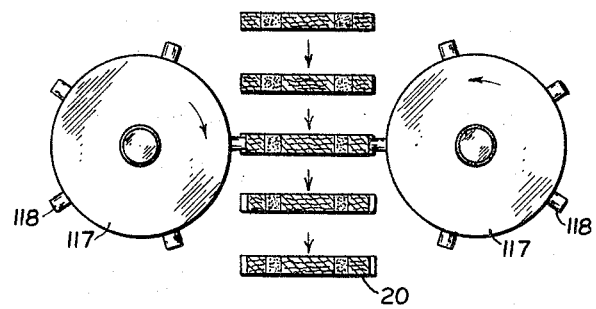
Fig. 14
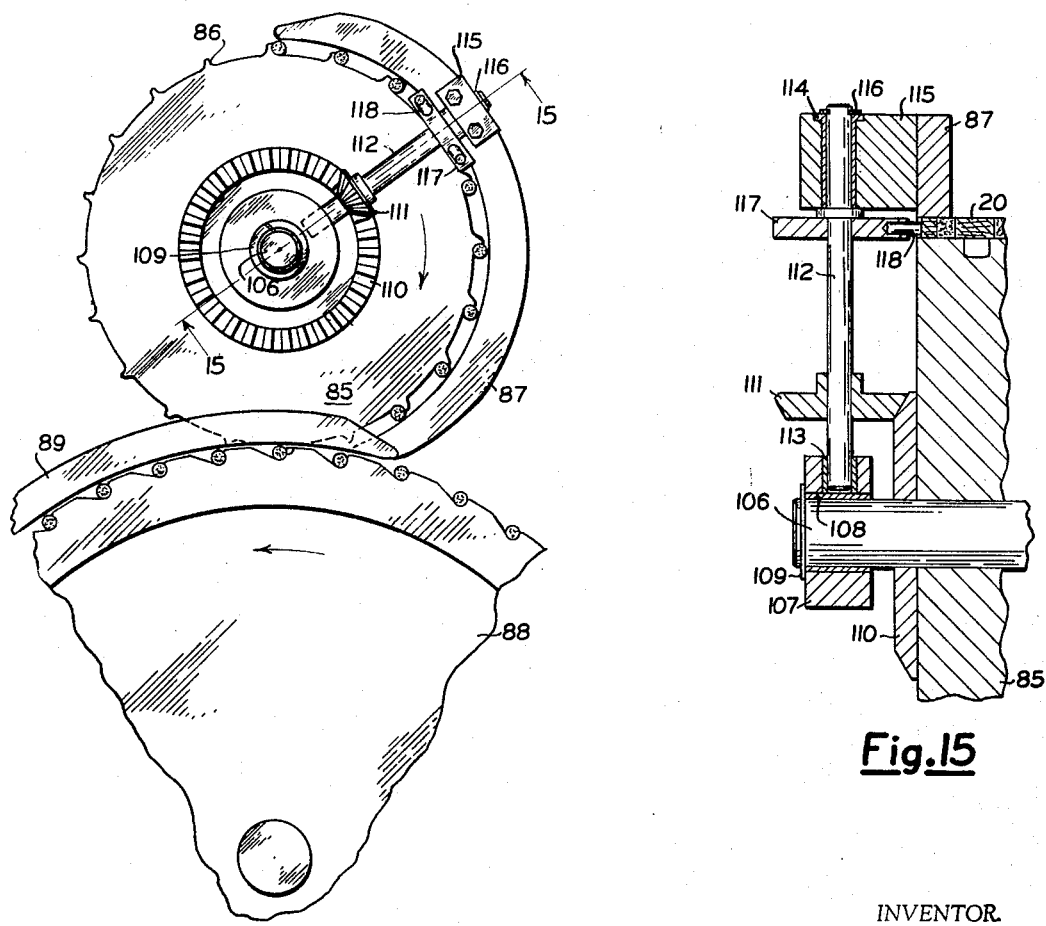
Fig. 13
Fig. 15
INVENTOR.
FLOYD V. HALL
BY Kenyon & Kenyon
ATTORNEYS Nov. 28, 1967  F. V. HALL  3,354,887
APPARATUS FOR COMPACTING CIGARETTE FILTER TIP ASSEMBLIES
CONTAINING GRANULAR MATERIAL
Filed Jan. 4, 1965  7 Sheets-Sheet 7
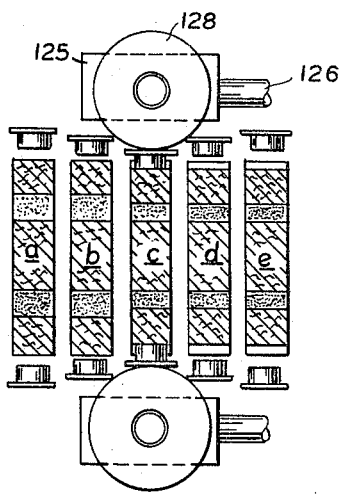
Fig.17
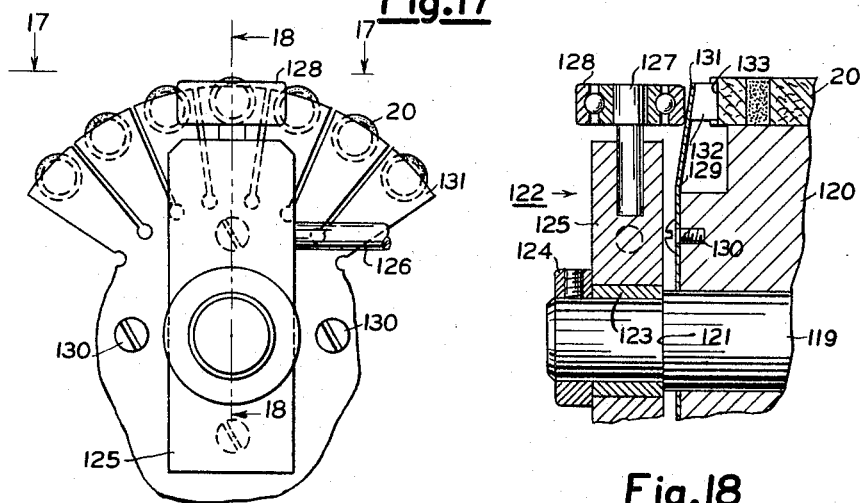
Fig.16
Fig.18
INVENTOR.
FLOYD V. HALL
BY
ATTORNEYS

3,354,887
APPARATUS FOR COMPACTING CIGARETTE FILTER TIP ASSEMBLIES CONTAINING GRANULAR MATERIAL
Floyd Vanmeda Hall, Durham, N.C., assignor to Liggett & Myers Tobacco Co., New York, N.Y., a corporation of New Jersey
Filed Jan. 4, 1965, Ser. No. 423,098
12 Claims. (Cl. 131—94)

ABSTRACT OF THE DISCLOSURE

The apparatus includes a device for compacting the charge of charcoal granular material within each multi-section filter tip assembly. The device includes a pair of arms which are resiliently mounted and a cam means for pressing the arms towards each other upon positioning of a filter tip assembly between the arms.

---

This invention relates to an apparatus for compacting filter tips for cigarettes. It relates particularly to an apparatus and process for compacting filter tips for cigarettes which are of multi-sectional internal construction. It relates more particularly to an apparatus for compacting filter tips for cigarettes, which tips each comprise two sections of fibrous entrainment-type filter material, e.g., cellulose acetate, separated by a section of granular adsorption-type filter material, e.g., charcoal, these three sections being bound into an assembly by at least one layer of mouthpiece paper.

For a filter tip attachment apparatus, that is, for an apparatus for attaching the filter portion to the tobacco portion of a filter tip cigarette, it is an object of the present invention to provide a filter compactor apparatus and process for a multi-sectional filter tip assembly comprising two sections of fibrous entrainment-type filter material separated by a section of granular adsorption-type filter material whereby the compactor effects a reduction in volume of the granular adsorption-type filter material section to achieve such a distribution of the granular material therein as to insure that essentially all cigarette smoke passing through this section will come into surface contact with this material.

Within the scope of the foregoing object, it is an object of this invention to provide an apparatus of the kind described whereby the volume of the granular adsorption-type filter material section is reduced to substantially that of the granular material within it so that this material essentially fills this section.

Within the scope of the foregoing objects, it is an object of this invention to provide an apparatus and process of the kind described which may be easily applied to and used in connection with a standard filter tip attachment apparatus without slowing down or in any way impairing the normal operation of this apparatus.

Apparatus is currently used in the manufacture of filter tip cigarettes which fabricates filter tip material in lengths equal to a plurality of filter tips, for example, filter tips or filter tip assemblies for six cigarettes. These lengths of filter tip material are cut into shorter lengths equal in length to two filter tips or filter tip assemblies, and the shorter lengths of filter tip material are assembled between and in abutting alignment with successive pairs of cigarette tobacco portions which are cut from a continuously formed cigarette rod. Short strips of gummed or adhesive-coated tipping paper are adhered to the filter tip material or assemblies and the adjacent ends of the cigarette tobacco portions in axial array and these arrays introduced into a wrapping drum. Hinged plates or fingers on the wrapping drum fold the strips of tipping paper around the double filter tip portions and the adjacent ends of the cigarette tobacco portions to form double cigarette tobacco and filter units which are then cut through the middle of the filter portion to form successive pairs of separate filter tip cigarettes. Machines which perform the aligning, wrapping, and cutting operations just described are known as cigarette filter tip attachment machines.

According to the present invention, there is provided apparatus which is adapted to be mounted on cigarette filter tip attachment machines of kinds commonly known to the prior art and as described functionally above; for example, the AMF 1-122 made by American Machine and Foundry Company, New York, New York. The inventive apparatus is adapted to be mounted on this machine at a position therein at least slightly ahead of the one at which actual joining of filter and tobacco portions is effected according to the normal flow of material through the machine. In a given embodiment, the inventive apparatus comprises a plurality of pairs of resilient or spring-loaded compacting arms which are adapted to be operated in synchronism with the filter tip attachment machine whereby successive pairs of arms are positioned adjacent, pushed in against, and then withdrawn from the fibrous entrainment-type filter material ends of successive double-length filter tip assemblies of the kind described.

Each compacting arm includes a pressure pad which comes into direct contact with the fibrous material in the ends of the filter tip assemblies. The pressure pads of a given pair of arms are positively urged towards each other by cam action to force the fibrous entrainment-type filter elements in each end of a double-length filter tip assembly towards each other so as to reduce the volumes of the granular adsorption-type filter material sections. Thereupon these sections become substantially completely filled with the granular materials predisposed within them by having their volumes conformed to the volumes of their contents. The resulting substantially completely filled granular adsorption-type filter material sections thereby insure that all cigarette smoke which later passes through these sections will come into surface contact with granular filter material, this material being compacted between the one central and two end elements of fibrous filter material.

At the end of their inward or compacting motion, each pair of arms of the apparatus of the present invention are relieved of cam pressure and allowed to snap back outwardly under spring force or action. The ends of each successive double-length filter tip assembly are then left clear, as these assemblies are themselves advanced, to have cigarette tobacco portions brought up against them in abutting relations as described above. Wrapping and cutting operations to joint the double-length filter tip assembly and the two cigarette tobacco portions and thereafter divide this assembly into two filter tip cigarettes are then carried out, likewise as described above.

Other cigarette filter tip attachment machines on which various apparatus embodiments of the present invention are suitable to be installed include the Max and Max III machines made by Werke Körber & Co., KG., Hamburg, Germany.

With respect to process, it is contemplated that the present invention comprises the several steps and the relation and order of one or more of such steps with respect to each of the others for the production of a compacted filter tip for cigarettes.

It is further contemplated that among these steps is the positioning of at least one multi-sectional filter tip on an assembler drum conveyor as commonly used in the art; positioning in synchronism a pair of filter tip compactor arms adjacent the fibrous entrainment-type material ends of the filter tip; forcing the compactor arms against the ends of the filter tip; compacting the fibrous entrainment-type filter material and the granular adsorption-type filter material space there between, and releasing the compactor arms from engagement with the ends of the filter tip.

The new compacting apparatus requires hardly any modification of any existing means for manufacturing the filter tips or cigarette tobacco portions or of any means for joining or severing the tobacco and filter tip portions of finished cigarettes. The new compacting apparatus need only be synchronized to perform the compacting operation when the filter tips are in proper position and such synchronization can be obtained by driving the compactor by means of appropriate gearing or the like.

The invention accordingly comprises the several steps and the relation and order of one or more of such steps with respect to each of the others, and the apparatus embodying features of construction, combination of elements and arrangement of parts which are adapted to effect such steps, all as exemplified in the following detailed disclosure, and the scope of the application of which is indicated in the claims.

The nature and substance of this invention as well as its objects and advantages will be more clearly perceived and fully understood by referring to the following description and claims taken in connection with the accompanying drawings in which:

FIG. 5 is a view in longitudinal section of said first embodiment of the filter tip compactor of this invention taken on the line 5—5 in FIG. 6 looking in the direction of the arrows;

FIG. 5A is a view in sectional plan of one of the cams of said first embodiment of the filter tip compactor of this invention taken on line 5A—5A in FIG. 5 looking in the direction of the arrows;

FIG. 6 is an enlarged view in side or end elevation showing said first embodiment of the filter tip compactor of this invention in place on the machine of FIG. 1;

FIG. 13 is a view in side elevation illustrating certain component parts and assemblies of a Körber Max cigarette filter tip attachment machine with a fourth embodiment of the filter tip compactor of this invention in place on the machine;

FIG. 14 is a schematic illustration of the step of compacting a double-length filter tip assembly by means of apparatus shown in FIG. 13;

FIG. 15 is an enlarged view in section taken on line 15—15 in FIG. 13 looking in the direction of the arrows showing the bevel gear drive of said fourth embodiment of the filter compactor of this invention;

FIG. 16 is a view in side elevation illustrating certain component parts and assemblies of a Körber Max III cigarette filter tip attachment machine with a fifth embodiment of the filter tip compactor of this invention in place on the machine;

FIG. 17 is a schematic illustration of the step of compacting a double-length filter tip assembly by means of apparatus shown in FIG. 16; and FIG. 18 is an enlarged view in section taken on line 18—18 in FIG. 16 looking in the direction of the arrows showing a representative compacting arm in deflected or compacting position under cam action as at station 17c in FIG. 17.

Figure 1:
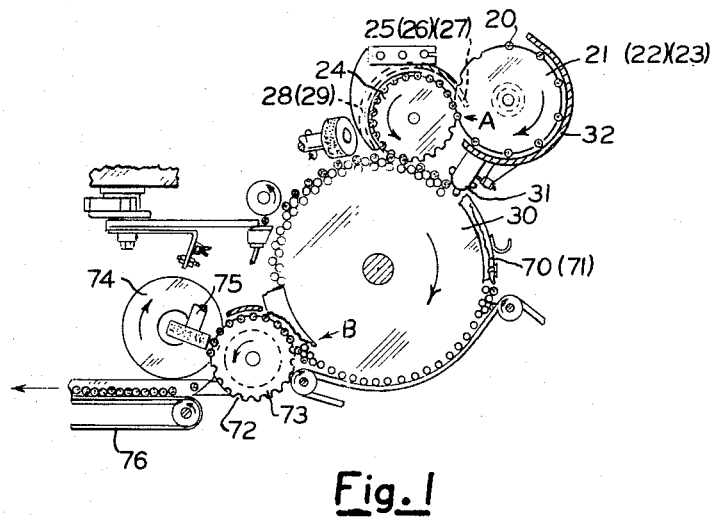
FIG. 1 is a view in side elevation, partly in section, illustrating certain component parts and assemblies of an AMF 1-122 cigarette filter tip attachment machine with a first embodiment of the filter tip compactor of this invention shown in place on the machine.

Referring now to the drawings in detail, the filter tip compactor of the present invention will be described by way of a first example in relationship with an apparatus for making filter tip cigarettes as described in United States Patent No. 3,036,581, issued to G. Dearsley on May 29, 1962, this apparatus being generally comparable to the AMF 1-122 machine previously mentioned.

Figure 3:
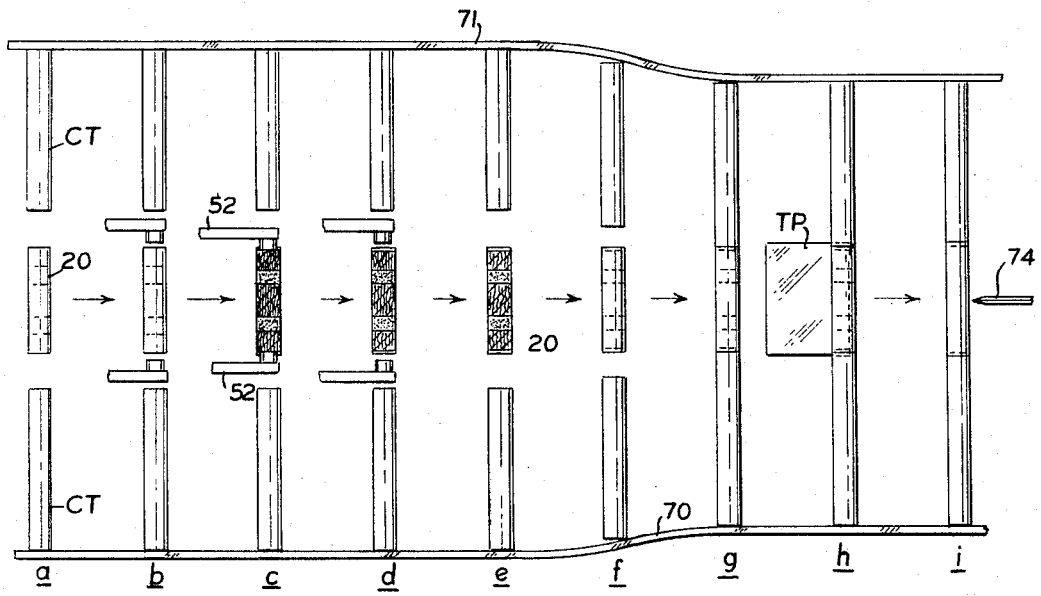
FIG. 3 is a schematic illustration of the steps of compacting a double-length filter tip assembly; bringing two cigarette tobacco portions into endwise abutting relation with this assembly; wrapping and joining the tobacco portions and double-length filter tip assembly, and separating the unit produced thereby into two cigarettes, all by means of apparatus shown in FIG. 1.

Referring particularly to FIGS. 1 and 3, multi-sectional filter tip assemblies 20 containing filter tip materials for two filter tip cigarettes are delivered to filter tip separating drums 21, 22, 23, one behind the other, which rotate in the direction indicated by the arrow on drum 21. As the double-length filter tip assemblies 20 travel on these drums they are circumferentially separated from one another by successive ones of the separating drums rotating at a slightly higher rate of speed than its adjacent drum. In this manner components of groups of three double-length filter tip assemblies 20 are circumferentially spaced with respect to each other so that by the time they reach station A only one double-length filter tip assembly at a time will be stripped from its respective filter tip separating drum 21, 22, or 23 into a groove of a filter tip aligning drum 24 which rotates in the direction indicated by the arrow on this drum. This stripping action is effected by the strippers 25, 26, and 27 which extend into suitable grooves formed in the filter tip separating drums 21, 22, and 23.

As the drum 24 continues its rotation, successive double-length filter tip assemblies 20 are moved by aligning cams 28 and 29 into the same position in a row in side-by-side spaced relationship. The double-length filter tip assemblies are then discharged into suitable roller receiving pockets formed on the periphery of the cigarette assembly drum 30 in between two lengths of cut cigarette tobacco portions CT, as shown at station 3a (station a in FIG. 3). The cigarette assembly drum 30 rotates continuously in the direction indicated by the arrow on it, driven by a train of mechanism shown partly in FIG. 2, and carries with it successive arrays of two spaced cigarette tobacco portions and a double-length filter tip assembly 20 located therebetween in its roller-type pockets. The filter tip compactor generally designated 31 is mounted on the filter tip separating drum housing 32 and is positioned with respect to the cigarette assembly drum 30 so that it compacts the double-length filter tip assemblies 20 without interfering with the operation of the cigarette filter tip attachment machine as shown at stations 3b, 3c and 3d.

Figure 2:
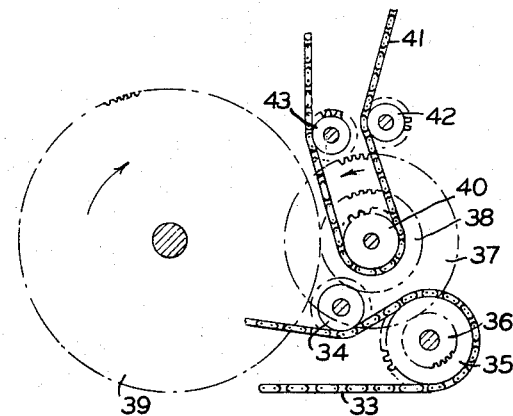
FIG. 2 is a schematic view in side elevation, partly in section, illustrating the chain drive mechanism for the machine parts and assemblies shown in FIG. 1.

Referring next to FIG. 2, the chain drive mechanism for the pertinent portion of the cigarette filter tip attachment machine shown in FIG. 1 is actuated by a motor-driven shaft and sprocket wheel (not shown) through the chain 33, which is maintained substantially free of slack by idler 34. Chain 33 causes the twenty-four tooth sprocket wheel 35 and its shaft to rotate in the direction indicated by the arrow on this wheel. A twelve-tooth pinion 36 is mounted on the shaft of sprocket wheel 35, and turns with this shaft. Pinion 36 is meshed with and drives a ninety-six tooth gear 37 which is rotated along with its shaft in the direction indicated by the arrow on this gear. A twenty-tooth gear 38 is mounted on the shaft of gear 37 and turns with this shaft. Gear 38 is meshed with and drives a one-hundred-forty tooth cigarette assembly drum gear 39 along with the shaft of the gear which in turn causes rotation of the cigarette assembly drum 30 mounted on the same shaft. A twelve-tooth sprocket wheel 40 is also mounted on and turned with the shaft of gear 37 and drives chain 41 which is maintained substantially free of slack by idler 42 and extends upwardly to drive a plug cutting drum, not shown. This sprocket chain passes over fifteen-tooth compactor sprocket wheel 43, and causes this wheel to rotate in the direction indicated by the arrow thereon. Sprocket wheel 43 is substituted substantially directly for an idler wheel initially provided in the cigarette filter tip attachment machine. The shaft of the compactor sprocket wheel is turned with this wheel which thereby provides rotation of the whole compactor assembly 31 as described more completely in connection with FIGS. 4, 5, and 6.

Referring next to FIGS. 4, 5 5A, and 6, the filter tip compactor 31 is mounted on housing 32 by means of support legs 44 which are bolted thereto. A compactor drive shaft 45, passing through the front plate of the cigarette filter tip attachment machine, is rotatably mounted in support legs 44 by means of bearings 46 and 47. On the end of this shaft 45 within the machine is fastened compactor sprocket 43 which meshes with chain 41 as shown schematically in FIG. 2 and described above. Fastened on, by means of a set screw not shown, and rotated with and by drive shaft 45 is an operating assembly generally designated 48, comprising an annular housing 49 suitably connected to the drive shaft 45 and provided with a plurality of through-going equally spaced longitudinal holes 50 (ten in the embodiment illustrated) near its circumferential surface and a like plurality of radial slots or grooves 51 in each end thereof connecting with the holes 50. In each longitudinal hole 50 and its connecting pair of end grooves are slidably mounted a pair of mutually opposed compactor arms indicated generally as 52, one at each end of each groove and the recess associated therewith. Between each pair of compactor arms 52 is disposed a compression-type coil spring 53 tending to urge the arms apart. The housing 49 has a pair of annular end plates 54 which are connected to it by screws or other suitable means, and which serve to limit the outward movement of the compactor arms. Each compactor arm 52 comprises a radially extending portion 55, a pressure pad 56 mounted on the inner surface of the outer extremity of this portion, and a stub shaft portion 57 fixed to and passing through the radially extending portion as shown. Each stub shaft portion extends into a longitudinal hole 50 in the housing, and is borne upon directly by a coil spring 53. Each stub shaft portion 57 also extends longitudinally beyond the housing 49 through a clearance hole in the adjacent annular end plate 54.

The entire compactor mechanism 31 further comprises a pair of cams 58, one at each end of operating assembly 48, having bushings 59, 60 press fitted in them within which drive shaft 45 is rotatable. The cams themselves are restrained against rotation by synchronizing or adjustment mechanism 61. A collar 62 is mounted on a drive shaft 45 adjacent bushing 59 by means of a threaded screw 63 or other suitable means. This synchronizing mechanism is pivotably connected to each cam 58 by a pivot pin 64, and comprises a threaded adjusting link 65 extending from each pivot pin 64 and slidably passing through a clear hole in adjusting bar 66. This adjusting bar is suitably mounted on the filter tip separating drum housing 32. On opposite sides of bar 66, nuts 67 and 68 are in screwed engagement with links 65. These nuts, which are tightened against bar 66, effect the angular positioning of cams 58 around the axis of drive shaft 45 by allowing threaded links 65 to be moved transversely with respect to bar 66.

In operation, the cams 58 are adjusted angularly around the axis of shaft 45 by means of synchronizing mechanism 61 so that their beveled and otherwise apropriately shaped cam surfaces 69, shown particularly in FIG. 5A, will bear upon the rounded outer ends of the stub shaft portions 57 of the compactor arms 52 projecting out of each of the annular end plates 54 at points which will cause the compactor arm pressure pads 56 to press in on the ends of the double-length filter tip assemblies 20 centrally thereof. As the compactor arms 52 are rotated, the outer ends of their stub shaft portions come successively into contact with the cam surfaces 69. These stub shaft portions and the complete compactor arms of which they are components are thereby urged inwardly in pairs with respect to annualr housing 49 against the force of springs 53. This causes successive opposed pairs of pressure pads 56 to bear upon and compact the ends of successive filter tip assemblies 20 as shown at station 3c in FIG. 3. With the exertion of pressure upon the ends of each double-length filter tip assembly 20, the fibrous entrainment-type filter material at each end thereof is pushed towards the center of the assembly and the two granular adsorption-type filter material sections are thereby reduced in volume. Consequently, the granular adsorption-type filter material actually within these sections is caused to completely fill them, that is, to fill the spaces between the central and two end fibrous entrainment-type filter material sections of the double filter tip assembly. When each pair of compactor arms 52 is rotated clear of cams 58 they will be moved outwardly apart from each other by action of interposed spring 53, and out of touch with any double-length filter tip assembly upon which they were formerly exerting pressure.

Figure 4:
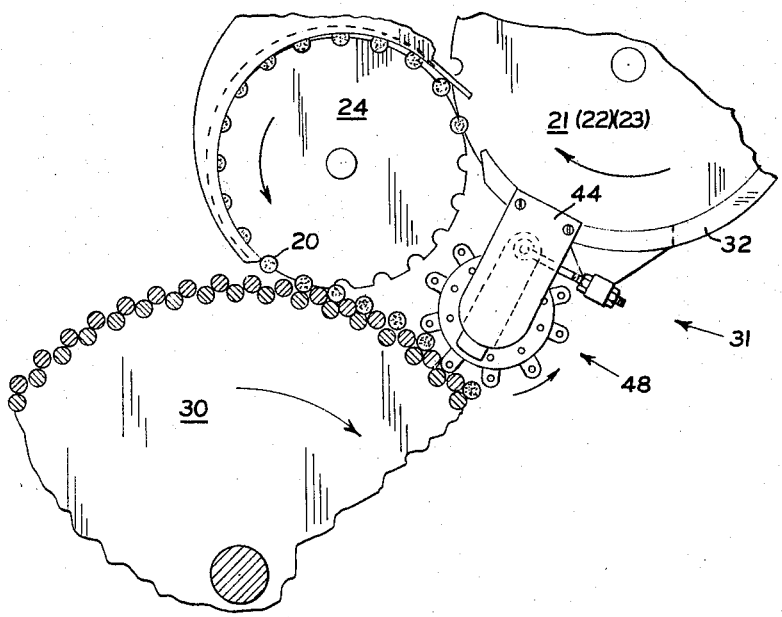
FIG. 4 is a view in side elevation illustrating said first embodiment of the filter tip compactor of this invention mounted in operating position on the filter tip separating drum of the machine of FIG. 1.

In a proper installation of the cigarette filter tip compactor of this invention as so far described, the circumferential line of centers of the pressure pads on the compactor arms 52 should coincide substantially for a short distance with the circumferential line of centers of the double-length filter tip assemblies lying in the roller-type pockets defined on the periphery of cigarette assembly drum 30. This condition is indicated in FIGS. 4 and 6 particularly. Further, the rotational timing of compactor operating assembly 48 and cigarette assembly drum 30 must be such that the pressure pads of successive pairs of compactor arms actually come briefly into substantial alignment with the ends of successive double-length filter tip assemblies on the drum. This condition is also indicated in FIGS. 4 and 6, and is shown at least schematically in FIG. 3. In an actual reduction to practice of this invention as so far described, a filter tip compactor having ten pairs of arms has been operated with a cigarette assembly drum having fifty-six peripheral pockets and the just-stated condition has been achieved, drive for the compactor and the drum coming from a chain drive mechanism specifically as illustrated in and described in connection with FIG. 2.

Still further, the timing of the action of cams 58 on stub shaft portions 57 of successive pairs of compactor arms 52 must be such that the arms are closed in toward the double-length filter tip asembly between their pressure pads during the brief interval in which the pressure pads are in substantial alignment with the ends of the filter tip assembly as aforesaid. This condition is indicated in FIGS. 3 and 5 particularly. The action of cams 58 is advanced or retarded as necessary by means of synchronizing mechanism 61. Manipulation of nuts 67 and 68 will cause cams 58 to be swung around the axis of compaction drive shaft 45 through the pull or push of links 65. If the lower ends of cams 58, where cam surfaces 69 are located, as moved to the left according to the view in FIG. 6 the cam action will be advanced whereas it will be retarded if the lower ends of the cams are moved to the right.

As delivered onto cigarette assembly drum 30, each double-length filter tip assembly 20 has an outer layer of paper known as mouthpiece paper which extends for its full length and which defines both the inner and outer circumferential boundaries of the two sections of the assembly in which the granular adsorption-type filter material is located. The fibrous entrainment-type filter material in the center and two end sections of the double-length filter tip assembly is immediately bounded by a layer of paper known as plug wrap paper which extends only for the lengths of the fibrous filter material itself and which is in turn bounded by the aforementioned mouthpiece paper. The diameter of pressure pads 56 and all pertinent timing adjustments of the filter tip compactor apparatus should be such that as the arms of any pair of compactor arms 52 are moved in toward a double-length filter tip assembly 20 their pressure pads will bear only upon fibrous filter material at the ends of this assembly; that is, that their pressure pads will not bear upon the layers of plug wrap and mouthpiece paper surrounding this material and thus not break down any part of the edges of these layers. A proper fitting of pressure pads within layers of plug wrap and mouthpiece paper is shown in the case of the lower pair of compactor arms appearing in FIG. 5.

The general dimensions of the filter tip compactor apparatus of this invention as so far described must, of course, be so accommodated to the dimensions of the cigarette filter tip attachment machine on which it is mounted that each pair of its compactor arms can be swung in around the ends of successive double-length filter tip assemblies, moved in against these assemblies, withdrawn from these assemblies, and then swung away clear of them all without disturbing the cigarette tobacco portions on either side of the filter tip assembly on the cigarette assembly drum. This design and operating condition is indicated schematically in FIG. 3.

As each compacted double-length filter tip assembly 20 and its corresponding cigarette tobacco portions continue their advance with continued rotation of cigarette assembly drum 30, they are gradually brought into endwise abutment by means of stationary guides 70, 71 as shown at stations 3e to 3g in FIG. 3. Following these three members being abutted, they are joined together by a strip of tipping paper TP, for example, a strip of paper having a cork pattern, as described in the aforementioned United States Patent No. 3,036,581 (see also United States Patent No. 3,148,683 to I. T. Brown et al., issued Sept. 15, 1964), and as shown at station 3h in FIG. 3. Upon reaching station B in FIG. 1, the joined tobacco portions and double-length filter tip assemblies drop into successive pockets 72 of the cutting drum 73 which rotates in the direction indicated by the arrow on this drum in FIG. 1. As the cutting drum rotates, successive joined tobacco and filter portions, each of which constitutes two filter tip cigarettes joined end-to-end, are severed at their centers into two finished filter tip cigarettes by means of a rotating knife as shown at station 3i in FIG. 3. When a double-length joined tobacco and filter structure has been so severed, a separating roller 75 engages with one of the resulting individual filter tip cigarettes and pushes it axially away from the cutting knife 74, thus providing a space between the severed or separated cigarettes before they are discharged onto the catcher belts 76 for handling in further operations such as packaging.

Figure 7:
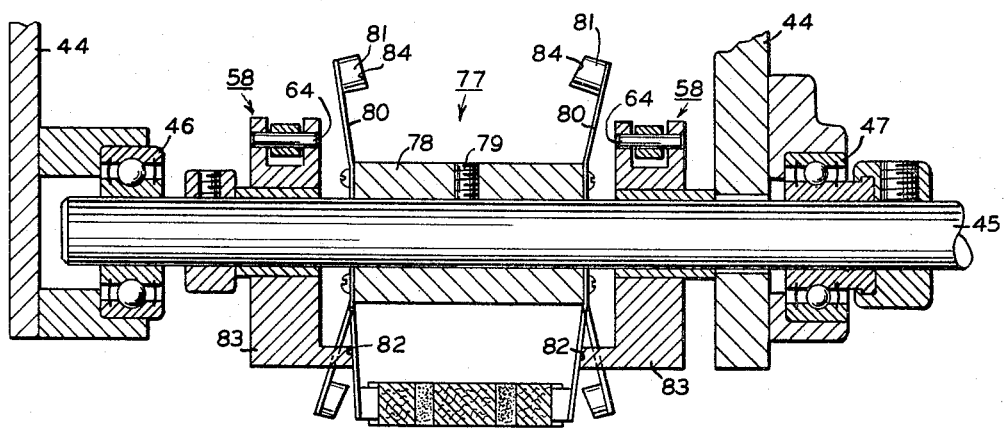
FIG. 7 is a view in longitudinal section taken on line 7—7 in FIG. 8 looking in the direction of the arrows.
Figure 8:
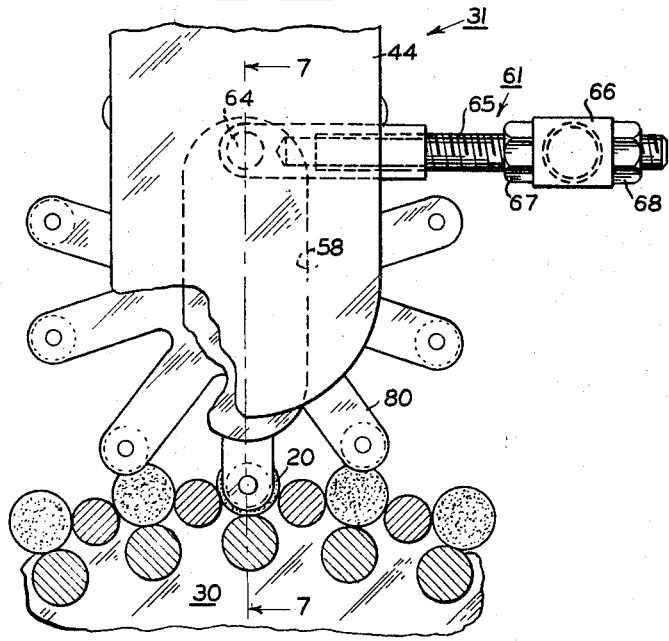
FIG. 8 is an enlarged view in side or end elevation showing a second embodiment of the filter tip compactor of this invention in place on the machine of FIG. 1.
Figure 10:
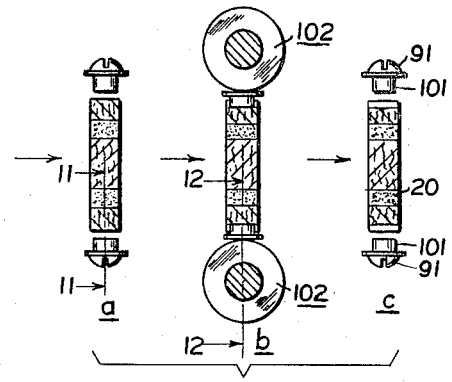
FIG. 10 is a schematic illustration of the step of compacting a double-length filter tip assembly by means of apparatus shown in FIG. 9.
Figure 12:
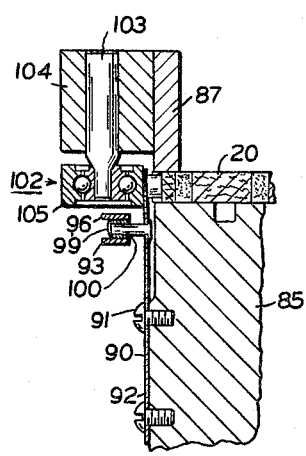
FIG. 12 is an enlarged view in section taken on line 12—12 in FIG. 9 looking in the direction of the arrows showing a representative compactor arm in deflected or compacting position under cam action as at station 10b in FIG. 10.

Referring next to FIGS. 7 and 8, there is illustrated another embodiment of the filter tip compactor of the present invention, also suitable for installation on an AMF 1–122 cigarette filter tip attachment machine. In this embodiment, as contrasted with the one just described, there is a modification of the operating assembly with the compactor mounting means remaining as described above and the cam means remaining substantially the same except for a slight modification of the cam surfaces. In FIGS. 7 and 8 the operating assembly 77 comprises an annular sleeve or housing 78 which is secured to the compactor drive shaft 45 by means of a set screw 79. Extending substantially radially outwardly from each end of housing 78 are a plurality of equally spaced resilient compactor arms 80, each having a pressure pad 81 on the inner surface of its outer end. The compactor arms are paired from end to end of the housing. At each end of housing 79 these arms may be in the form of individual leaf springs or the radially extending elements of a fingered plate of spring material. The latter form is the one shown in FIGS. 7 and 8 with the fingered plates attached to each end of housing 78 by screws, and being centrally bored out to permit the passage through them of drive shaft 45. whichever form is used, the free attitude of the compactor arms of each pair of arms should be that of flaring at least somewhat outwardly as typified by the upper pair of compact or arms shown in FIG. 7.

In operation of the embodiment of the present invention shown in FIGS. 7 and 8, rotation of drive shaft 45 brings successive pairs of compactor arms 80 into contact with the working surfaces 82 of cams 83, and the arms of each pair are thereby urged inwardly towards each other; that is, they are urged inwardly into deflected or compacting position. Consequently the slanted contacting or working surfaces 84 of pressure pads 81 are brought into pressure contact with the fibrous filter material at the ends of the double-length filter tip assembly 20 between them and achieve a compacting effect on this filter of the nature previously described. By reason of pressure pad surfaces 84 being slanted with respect to the surfaces of compactor arms 80 to which the pads are attached, surfaces 84 will come substantially flat up against the ends of filter tip assemblies between them as the compactor arms are flexed inwardly, and so exert a substantially even pressure on these ends.

Upon passing the cam surfaces 82, the resilient, deflected compactor arms 80 will spring back to their original free attitude to be moved in around another double-length filter tip assembly in the course of continued operation of the illustrated apparatus. The timing requirements for the filter tip compactor shown in FIGS. 7 and 8 are the same as those for the compactor shown in FIGS. 1–6. Appropriate timing or synchronization is effected by identical means from compactor to compactor, that is, by adjustment of nuts 67 and 68 on links 65 running from adjusting bar 66 to pivot pins 64 at the upper ends of the cams to set the angular position of the cams 83 and their working surfaces 82 with respect to the axis of compactor drive shaft 45.

Figure 9:
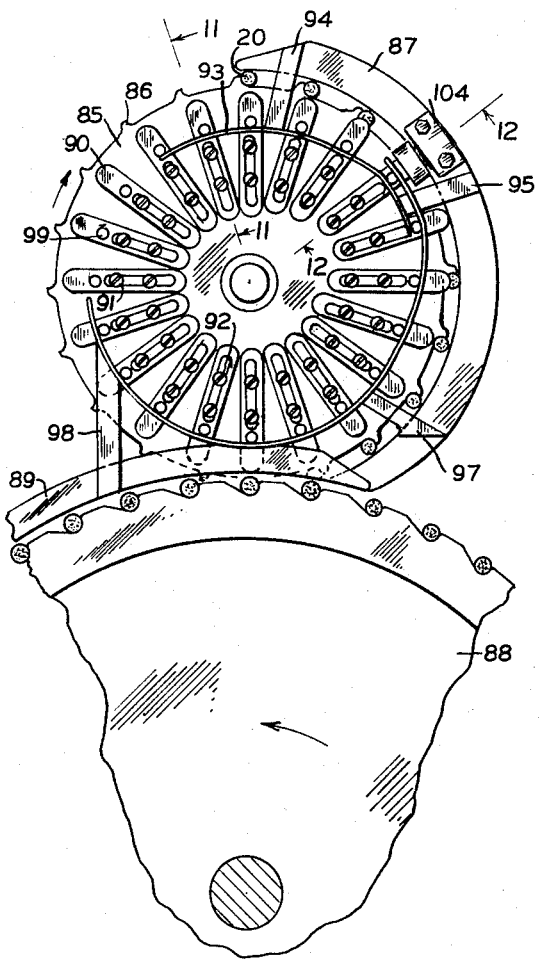
FIG. 9 is a view in side elevation illustrating certain component parts and assemblies of a Körber Max cigarette filter tip attachment machine with a third embodiment of the filter tip compactor of this invention in place on the machine.

Referring next to FIGS. 9, 10, 11 and 12, another embodiment of the present invention is illustrated which is adapted to be mounted on an apparatus for attaching filter tips to cigarettes which is manufactured as a Körber Max machine. It is to be understood that only one side of the embodiment will be described as the other side is essentially identical to it. As shown in FIG. 9, double-length filter tip assemblies 20 are delivered to a transfer drum 85 by means not illustrated, and are maintained in fixed positions thereon by a plurality of aligned drum abutments 86 and a shroud 87 which partly overlies and is spaced from the transfer drum. The filter tip assemblies 20 rotate with drum 85 in the direction indicated by the arrow adjacent the drum, and are deposited from it onto a cigarette assembly drum 88 between cigarette tobacco portions. Drum 88 rotates in the direction indicated by the arrow thereon, and is partly overlaid by a shroud 89. A plurality of radial spring fingers 90 are slidably mounted on the diametral sides of transfer drum 85 by means of pairs of spaced screws 91 and 92 or other suitable means passing through an elongated slot in each finger 90. A cam 93 is mounted on shroud 87 by means of support members 94 and 95. So also, a cam 96 is mounted on shrouds 87 and 89 by means of support members 97 and 98.

Cams 93 and 96 are adapted to extend and retract the fingers 90 as the drum 85 rotates with respect to fixed shrouds 87 and 89. A pin 99 provided with a rotatable bushing 100 for wear reduction purposes is mounted on each finger 90. In the course of normal rotation of drum 89 the bushing 100 associated with each finger 90 comes into contact with the outer or working surface of cam 93 at the left hand end thereof, and by action of this cam is caused to move the finger radially outwardly until a pressure pad 101 on the inner surface of the finger near its outer end is brought into substantially axial alignment with a double-length filter tip assembly. Just when each spring finger 90 is fully extended radially by action of cam 93, its rotatable bushing 100 passes underneath and comes practically into contact with the inner or working surface of cam 96.

Figure 11:
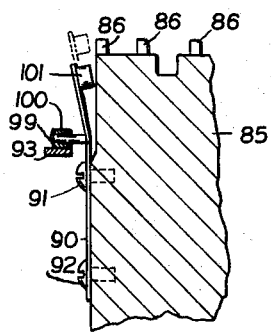
FIG. 11 is an enlarged view in section taken on line 11—11 in FIG. 9 looking in the direction of the arrows showing a representative compactor arm in free or withdrawn position as at station 10a in FIG. 10.

A ball bearing 102 in the nature of a cam is mounted on shroud 87 by means of a fixed shaft 103 and support block 104, and is positioned to intersect the plane of rotation of the spring fingers when their pressure pads 101 are extended radially into axial alignment with the double-length filter tip assemblies 20. The fingers 90 have a free or unstressed configuration as shown in FIG. 11 so that they will be flexed toward the double-length filter tip assemblies upon coming into contact with the outer race 105 of ball bearing 102 as shown particularly in FIG. 12. As any given spring finger 90 is rotated around to and past ball bearing 102, its upper or outer end carrying a pressure pad 101 is deflected inwardly so that the pad is moved into pressing contact with the adjacent end portion of fibrous entrainment-type material of filter tip assembly 20.

Keeping in mind that another pressure pad on another spring finger on the opposite diametrical side of transfer drum 85, not shown, is being simultaneously moved into pressing contact with the opposite fibrous end portion of filter tip assembly 20, it will be clear to those skilled in the art that the whole filter tip assembly is subjected to compacting action of the kind hereinbefore described as its end portions of fibrous entrainment-type filter material are pushed inwardly toward its central portion of this material. This action, with attendant reduction in volume of the filter tip assembly sections containing granular adsorption-type filter material, is shown in detail as a representative double-length filter tip assembly 20 is moved from station a to station b in FIG. 10.

After a spring finger 90 has been rotated beyond ball bearing 102, its upper portion carrying its pressure pad 101 will flex back outwardly away from the filter tip assembly 20 in line with it, and will assume the free attitude shown in dashed outline in FIG. 11. The pressure pads of both spring fingers disposed at opposite ends of the compacted filter tip assembly will be withdrawn fully clear of the assembly as shown at station c in FIG. 10. Continued rotation of transfer drum 85 will bring bushing 100 beyond the right hand end of cam 93, and still further rotation will cause cam 96 to bear on the bushing and shift the spring finger radially inwardly. The action of cam 96 thus retracts the spring fingers successively, once they have performed their compacting functions, bringing them in sufficiently far that they do not project past the circumferential surface of the transfer drum on its lower side, and thus do not come into contact or otherwise interfere with cigarette assembly drum 88 as they are swung past the upper side of the circumferential surface of the latter drum.

Referring next to FIGS. 13, 14, and 15, another embodiment of the present invention is illustrated which is also adapted to be mounted on the Körber Max machine. It is to be understood that only one side of the embodiment will be described as the other side is essentially identical to it. In this embodiment, drive shaft 106 of transfer drum 85 is extended beyond the drum and carries a bearing block 107 on its outer end. Block 107 is fitted internally with an axially extending bushing 108, and the block and bushing together are relatively rotatable with respect to shaft 106. The block is retained from moving off the end of the shaft by means of a snap ring 109 set in a circumferential groove in the shaft.

A bevel gear 110 is fixedly mounted on the diametral surface of transfer drum 85 concentrically with drive shaft 106, and thus rotates with the shaft and the drum. This gear meshes with a bevel gear 111 which is fixedly mounted on a compactor shaft 112 extending outwardly from and being rotatable within a bushing 113 set radially in bearing block 107. At its upper or outer end, shaft 112 is rotatably supported and guided in and by a sleeve bushing or bearing 114 disposed within a block 115 mounted on shroud 87. This shaft is held in place axially with respect to the block and bushing by means of a shaft collar just below block 115 and a snap ring 116 on the shaft just above the block.

A disc 117 is fixedly mounted on compactor shaft 112 with its median plane, as projected, coming substantially tangent to the circular arc described by the axial centers of double-length filter tip assemblies 20 as they are rotated on and by transfer drum 85. A plurality of essentially uniformly spaced pins 118 in the nature of pressure pads project radially from disc 117 sufficiently far that upon rotation of the disc they will extend successively into the orbital path of the double-length filter tip assemblies. As the filter tip assemblies 20 seated against abutments 86 are carried around on transfer drum 85, disc 117 and its pins 118 are rotated simultaneously therewith by the train of mechanism comprising gear 110, gear 111, and shaft 112.

Numbers of teeth on gears 110 and 111, the number of pins on disc 117, and the initial adjustment of the angular position of disc 117 with respect to transfer drum 85 are selected to achieve an operating condition in which successive pins or pressure pads 118 are brought into temporary pressing contact with the adjacent end portions of fibrous entrainment-type filter material of successive filter tip assemblies 20. Keeping in mind that successive pins 118 on a similarly positioned disc 117 on the opposite side of transfer drum 85 are being simultaneously moved into temporary pressing contact with the opposite fibrous end portions of the passing filter tip assemblies one after another, it will be clear to those skilled in the art that each double-length filter tip assembly 20 is subjected to compacting action of the kind hereinbefore described. This action or effect is shown in detail in FIG. 14.

Referring finally to FIGS. 16, 17, and 18, another embodiment of the present invention is illustrated which is adapted to be mounted on an apparatus for attaching filter tips to cigarettes which is manufactured as a Körber Max III machine. It is to be understood that only one side of the embodiment will be described as the other side is essentially identical to it. As shown in FIGS. 16 and 18, a drive shaft 119 carries on it a transfer drum 120, and at a shoulder 121 is stepped down in diameter as it extends outwardly beyond the drum. Double-length filter tip assemblies 20 are delivered to transfer drum 120 by means not illustrated, being seated successively in open pockets or grooves on the circumferential surface of the drum. The filter tip assemblies are retained in the pocket by shroud elements not shown, and are each carried around through a partial revolution of drum 120 until discharged therefrom to be deposited between cigarette tobacco portions on a cigarette assembly drum also not shown.

A cam assembly 122 is mounted on drive shaft 119 against shoulder 121, and is retained thereon by a collar 124. This assembly includes a block-like body element 125 having a bearing or bushing 123 press fitted in it. By means of this bushing the whole cam assembly has a turning fit on drive shaft 119, or, said in other words, the drive shaft may rotate within the cam assembly. Assembly 122 further includes a stub shaft 127 set fixedly in one end of body element 125 and a ball bearing 128 in the nature of a cam mounted on the outer end of this shaft. A rod 126 extends from the body element 125 and is secured at its other end, not shown, to the filter tip attachment machine structure. The primary function of rod 126 is to hold cam assembly 122 against rotation when drive shaft 119 is turning. Instead of being only a simple rod, however, it may take the form of a synchronizing or adjustment mechanism, such as adjustment mechanism 61, whereby the angular relation of cam assembly 122 to the axis of drive shaft 119 may be varied.

A relatively thin plate 129 of spring material is fastened to the diametral surface of transfer drum 120 by means of a plurality of screws 130. This plate is radially slotted so that it is configured to have a series of spring fingers 131 along its periphery with successive fingers matched with successive pocket or grooves in the circumferential surface of the transfer drum. Each finger has a pressure pad 132 on its inside surface at its outer end, and each pressure pad is characterized by a slanted contacting or working surface 133. In its normal or unstressed attitude, each spring finger lies in the principal plane of plate 129 and its pressure pad is well withdrawn out of possible contact with any filter tip assembly on drum 120. Cam assembly 122 is set in sufficiently close to the spring plate, however, that its ball bearing or cam element 128 extends into the plane of spring fingers 131 substantially at the radius of their pressure pads. Thus as any given spring finger 131 is rotated around to and past ball bearing 128 its outer end carrying a pressure pad 132 is deflected inwardly so that the pad is moved into temporary pressing contact with the adjacent end portion of fibrous entrainment-type material of a filter tip assembly 20. This action is shown particularly in FIG. 18.

Keeping in mind that another pressure pad on another spring finger on the opposite diametral side of transfer drum 120, not shown, is being moved simultaneously into temporary pressing contact with the opposite fibrous end portion of filter tip assembly 20, it will be clear to those skilled in the art that each succeeding double-length filter tip assembly is subjected to compacting action of the kind hereinbefore described as its end portions of fibrous entrainment-type filter material are pushed inwardly toward its central portion of this material. This action, with its attendant reduction in volume of the filter tip assembly sections containing granular adsorption-type filter material, is shown in detail as a representative double-length filter tip assembly is moved through a series of stations a, b, c, d, and e in FIG. 17 with the matching spring fingers first being deflected inwardly by the pair of ball bearings 128 and then allowed to flex back outwardly.

Protection by Letters Patent of this invention in all its aspects as the same are defined in the appended claims is sought to the greatest extent that the prior art allows.

What is claimed is:

1. An apparatus for compacting cigarette filter tip assemblies, said apparatus comprising (1) a shaft, (2) a housing mounted on said shaft to be rotatable therewith, (3) at least one pair of arms extending radially outwardly from said housing and matched oppositely from end to end thereof, said arms being capable of being moved toward and away from each other through at least a limited distance and being subject to resilient loading tending to keep them normally spaced distantly apart from each other, each of said arms including a pressure pad on the inner surface of its outer end so that the pressure pads of said pair of arms face each other and are adapted to bear on the ends of and exert compacting force upon a cigarette filter tip assembly lying between them when the arms of said pair of arms are moved toward each other, (4) support means for said shaft and housing within which said shaft is rotatable and which is adapted to be mounted on a cigarette filter tip attachment machine so that said housing is positioned adjacent the path of travel of cigarette filter tip assemblies ahead of their point of attachment to cigarette tobacco portions to bring the outer ends of said pair of arms into straddling relation with said path for a part of each complete rotation of said shaft and housing, and (5) cam means in spaced relation to said housing adapted to bear on both arms of said pair of arms essentially simultaneously while the arms are in straddling relation with the path of travel of cigarette filter tip assemblies and move the arms toward each other against said resilient loading.

2. An apparatus for compacting cigarette filter tip assemblies according to claim 1 in which said cam means comprises two cam elements rotatably mounted on said shaft on either side of said housing and linkages extending from said cam elements adapted to be attached to said cigarette filter tip attachment machine to hold the cam elements stationary with respect to said machine while said shaft is rotated.

3. An apparatus for compacting cigarette filter tip assemblies according to claim 2 in which said linkages are adjustable to vary the angular position of said cam elements with respect to the axis of said shaft.

4. An apparatus for compacting cigarette filter tip assemblies according to claim 1 in which said apparatus further comprises a gear on said shaft which is adapted to mesh with the drive mechanism of said cigarette filter tip attachment machine to drive said appartus in synchronism with said machine.

5. An apparatus for compacting cigarette filter tip assemblies, said apparatus comprising (1) a shaft, (2) a housing mounted on said shaft to be rotatable therewith, said housing including at least one through-going longitudinal hole near its lateral periphery, (3) a pair of arms slidably disposed in said hole one at either end of said housing, each of said arms comprising (i) a stub shaft portion within the hole, (ii) a radially extending portion mounted at an intermediate location on said stub shaft portion and projecting outwardly beyond the lateral periphery of said housing, and (iii) a pressure pad on the inner surface of the outer end of said radially extending portion so that the pressure pads of said pair of arms face each other and are adapted to bear on the ends of and exert compacting force upon a cigarette filter tip assembly lying between them when the arms of said pair of arms are moved toward each other, (4) a compression spring in said hole bearing on both of said stub shaft portions and tending to keep said arms normally spaced distantly apart from each other, (5) a pair of end plates affixed to said housing one at either end thereof, said end plates serving to limit the longitudinal movement of said arms under the expansive force of said compression spring and having clearance openings in them through which sections of reduced diameter of the stub shaft portions of said arms can project, (6) support means for said shaft and housing within which said shaft is rotatable and which is adapted to be mounted on a cigarette filter tip attachment machine so that said housing is positioned adjacent the path of travel of cigarette filter tip assemblies ahead of their point of attachment to cigarette tobacco portions to bring the outer ends of said pair of arms into straddling relation with said path for a part of each complete rotation of said shaft and housing, and (7) cam means in spaced relation to said housing adapted to bear on the sections of reduced diameter of the stub shaft portions of both arms of said pair of arms essentially simultaneously while the arms are in straddling relation with the path of travel of cigarette filter tip assemblies and move the arms toward each other against the expansive force of said compression spring.

6. An apparatus for compacting cigarette filter tip assemblies, said apparatus comprising (1) a shaft, (2) a housing mounted on said shaft to be rotated therewith, (3) a pair of plates of spring material affixed to said housing one at either end thereof, each of said plates including at least one radially extending flexible spring arm portion projecting outwardly beyond the lateral periphery of said housing and matched oppositely from end to end thereof, (4) a pressure pad on the inner surface of the outer end of each of said spring arm portions so that these pressure pads face each other and are adapted to bear on the ends of and exert compacting force upon a cigarette filter tip assmbly lying between them when the spring arm portions are flexed toward each other, (5) support means for said shaft and housing within which said shaft is rotatable and which is adapted to be mounted on a cigarette filter tip attachment machine so that said housing is positioned adjacent the path of travel of cigarette filter tip assemblies ahead of their point of attachment to cigarette tobacco portions to bring the outer ends of said matched spring arm portions into straddling relation with said path for a part of each complete rotation of said shaft and housing, and (6) cam means in spaced relation to said housing adapted to bear on both of said matched spring arm portions essentially simultaneously while these arm portions are in straddling relation with the path of travel of cigarette filter tip assemblies and flex the arm portions toward each other.

7. An apparatus for compacting cigarette filter tip assemblies according to claim 6 in which each of said matched spring arm portions has a free attitude wherein it is flared at least somewhat outwardly with respect to said housing, and in which said pressure pads have slanted contacting surfaces adapted to bear evenly upon the ends of a cigarette filter tip assembly lying between the pressure pads when the spring arm portions are flexed toward each other.

8. In combination with a cigarette filter tip attachment machine including a rotatable transfer drum onto the circumferential surface of which cigarette filter tip assemblies are delivered successively and from which these assemblies are deposited successively into interposed relation between cigarette tobacco portions, an apparatus for compacting cigarette filter tip assemblies, said apparatus comprising (1) at least one flexible spring finger mounted radially and movably on each of the diametral sides of said transfer drum and matched oppositely from side to side thereof at a place of filter tip assembly delivery onto the drum to constitute a pair of fingers, (2) a pressure pad on the inner surface of the outer end of each of said spring fingers so that, with the outer ends of the spring fingers moved out radially beyond the circumferential surface of the drum, these pressure pads face each other and are adapted to bear on the ends of and exert compacting force upon a cigarette filter tip assembly lying between them when the outer ends of the spring fingers are flexed toward each other, (3) first cam means adjacent said drum and engageable with both of said fingers in the course of rotation of said transfer drum to move said fingers radially with respect to the drum essentially similarly and simultaneously, extending the outer ends of said spring fingers outwardly beyond the circumferential surface of said drum for part of one revolution of the drum with a cigarette filter tip assembly in place on the drum and then retracting the fingers so that they are fully below this surface for the remainder of the revolution, and (4) second cam means adjacent said drum and adapted to bear on both of said spring fingers essentially simultaneously during at least a portion of that part of the revolution of said transfer drum in which the outer ends of the spring fingers are extended beyond the drum's circumferential surface and flex the spring fingers constituting said pair of fingers toward each other.

9. In combination with a cigarette filter tip attachment machine including a rotatable shaft-driven transfer drum onto the circumferential surface of which cigarette filter tip assemblies are delivered successively and from which these assemblies are deposited successively into interposed relation between cigarette tobacco portions, an apparatus for compacting cigarette filter tip assemblies, said apparatus comprising (1) a drive shaft extension on either side of said transfer drum, (2) a first gear mounted fixedly and centrally on each of the diametral sides of said transfer drum, (3) a bearing block on each of said drive shaft extensions, said blocks being rotatable with respect to said extensions, (4) a compactor shaft fitted rotatably in each of said bearing blocks, said compactor shafts extending perpendicularly to the axis of said drive shaft out about at least as far as the circumferential surface of said transfer drum, (5) means whereby said compactor shafts are freely rotatably maintained in attitudes in which they extend essentially parallel to each other in the same direction from said drive shaft and into an angular region through which cigarette filter tip assemblies are transferred on said drum, (6) at least one pressure pad mounted fixedly on each of said compactor shafts to extend for part of each revolution of these shafts into the orbital path of cigarette filter tip assemblies being transferred on and by said transfer drum, (7) a second gear mounted fixedly on each of said compactor shafts and meshed with the adjacent first gear on said transfer drum, said first and second gears being so sized and timed that as they rotate said compactor shafts in the course of rotation of said transfer drum the pressure pads on said compactor shafts are brought into facing relation across the circumferential surface of said drum to bear on the ends of and exert compacting force upon successive cigarette filter tip assemblies being transferred on and by said drum.

10. In combination with a cigarette filter tip attachment machine including a rotatable transfer drum onto the circumferential surface of which cigarette filter tip assemblies are delivered successively and from which these assemblies are deposited successively into interposed relation between cigarette tobacco portions, an apparatus for compacting cigarette filter tip assemblies, said apparatus comprising (1) a pair of plates of spring material affixed to said transfer drum one on either diametral side thereof, each of said plates including at least one radially extending flexible spring finger portion projecting outwardly beyond the circumferential surface of said transfer drum and said spring finger portions being matched oppositely from side to side of said drum at a place of filter tip assembly delivery onto the drum to constitute a pair of fingers, (2) a pressure pad on the inner surface of the outer end of each of said spring fingers, these pressure pads facing each other across the circumferential surface of the transfer drum and being adapted to bear on the ends of and exert compacting force upon a cigarette filter tip assembly lying between them when the spring fingers are flexed toward each other, (3) cam means adjacent said drum and adapted to bear on both of said spring fingers essentially simultaneously during at least a portion of that part of the rotation of said transfer drum in which a cigarette filter tip assembly is in place on said drum and flex the spring fingers constituting said pair of fingers toward each other.

11. The combination according to claim 10 in which said transfer drum is shaft-driven with its drive shaft having an extension on either side of said drum and in which said cam means comprises two cam assemblies rotatably mounted on said drive shaft on either side of said transfer drum and linkages extending from said cam assemblies attached to said cigarette filter tip attachment machine to hold the cam assemblies stationary with respect to said machine while the drive shaft of said transfer drum is rotated.

12. In combination with a cigarette filter tip attachment machine wherein cigarette filter tip assemblies are deposited successively into interposed relation between cigarette tobacco portions, an apparatus for compacting cigarette filter tip assemblies, said apparatus comprising at least one pair of movable pressure pads in facing relation between and with respect to which cigarette filter tip assemblies may be brought successively into axially aligned relation in the course of travel of said assemblies through said machine, and actuating means for moving said pressure pads toward and away from each other, said means being engaged with the drive system of said machine in such a way that said pressure pads are moved toward each other when a cigarette filter tip assembly is brought into axially aligned position between them to bear on the ends of and exert compacting force upon said assembly and are thereafter moved away from each other in the course of continued operation of said cigarette filter tip attachment machine and further travel of said cigarette filter tip assembly.

References Cited

UNITED STATES PATENTS

| | | | |
|---|---|---|---|
| 564,310 | 7/1896 | Lockwood et al. | 53—124 |
| 1,999,911 | 4/1935 | May | 131—94 |
| 2,284,117 | 5/1942 | Best | 131—25 |
| 2,307,906 | 1/1943 | Ahne | 93—1 |
| 3,036,581 | 5/1962 | Dearsley | 131—94 |
| 3,119,397 | 1/1964 | Molins et al. | 131—94 |
| 3,237,444 | 3/1966 | Kaeding et al. | 73—45.1 |

ALDRICH F. MEDBERY, *Primary Examiner.*